United States Patent [19]

Chuang

[11] 3,925,434

[45] Dec. 9, 1975

[54] THE REACTION OF CHLOROSILANES WITH UNSATURATED ORGANIC COMPOUNDS

[75] Inventor: Vincent T. Chuang, Marietta, Ohio

[73] Assignee: Union Carbide Corporation, New York, N.Y.

[22] Filed: Jan. 22, 1975

[21] Appl. No.: 543,128

[52] U.S. Cl. ..... 260/448.2 E; 260/448.8 R; 252/426
[51] Int. Cl.² ..... C07F 7/08; C07F 7/12; C07F 7/14
[58] Field of Search ............... 260/448.2 E, 448.8 R

[56] References Cited
UNITED STATES PATENTS

| | | | |
|---|---|---|---|
| 2,570,462 | 10/1951 | Lipscomb | 260/448.2 E |
| 2,570,463 | 10/1951 | Ernsberger et al. | 260/448.2 E |
| 3,099,670 | 7/1963 | Prober | 260/448.2 E |
| 3,153,662 | 10/1964 | Pike | 260/448.2 E |
| 3,167,573 | 1/1965 | Nitzsche et al. | 260/448.2 E |
| 3,188,299 | 6/1965 | Chalk | 260/448.2 E X |

*Primary Examiner*—Paul F. Shaver
*Attorney, Agent, or Firm*—Bernard Francis Crowe

[57] ABSTRACT

In the platinum catalyzed reaction of a chlorosilane with an olefinically unsaturated hydrocarbon other than acrylonitrile, promoters, such as, phenothiazine, diphenylamine, N,N-diphenyl-p-phenylenediamine and phenoxazine increase the rate of reaction.

13 Claims, No Drawings

THE REACTION OF CHLOROSILANES WITH UNSATURATED ORGANIC COMPOUNDS

BACKGROUND OF THE INVENTION

This invention pertains to an improved method for the addition reaction of a chlorosilane to an olefinically unsaturated hydrocarbon. More particularly it pertains to such a method where the chlorosilane contains at least one hydrogen atom bonded to silicon and the olefinically unsaturated hydrocarbon is not acrylonitrile.

It is known in the art that the preparation of organo functional silane coupling agents which are used to produce useful polymers, adhesives, coatings, oils and the like can be derived from intermediate chlorosilanes which in turn are synthesized by the reaction of a chlorosilane and an olefin using platinum as the catalyst. The temperature at which the chlorosilane-olefin reaction can proceed at a reasonable rate usually requires autoclave conditions, that is, reaction at superatmospheric pressures. With olefins containing an activated ethylenically unsaturated bond, such as, styrene or vinyl toluene, polymerization of the activated olefin tends to increase with increasing reaction temperature causing a corresponding decrease in the yield of the desired addition product. This can be partially overcome by using a large excess of chlorosilane reactant but this is undesirable since it leads to recycle problems and increased operating costs.

Another difficulty accompanying the use of activated olefins lies in the fact that the product can contain two structural isomers. Thus for example the product of the addition of a chlorosilane having at lease one SiH bond to styrene affords a product which consists of beta-phenylethychlorosilane and alpha-phenylethylchlorosilane. R. A. Pike et al. in U.S. Pat. No. 2,954,390 discloses a method for preparing only the beta isomer by conducting the reaction in the presence of a catalyst consisting of platinum supported on gamma alumina and a highly polar organic ether solvent such as n-butyl ether, ethylene glycol dimethyl ether or tetrahydrofuran. This answer to the problem has its economic drawbacks since the presence of the organic solvent, usually in an amount 2 to 4 times the weight of the styrene charged, decreases the reactor capacity significantly. With tetrahydrofuran there is also a diminution in yield of the beta isomer based upon the chlorosilane charged possibly due to the reaction of tetrahydrofuran with the chlorosilane to give undesired by-products.

The preparation of gamma-chloropropyltrichlorosilane from allyl chloride and trichlorosilane leads to low yields of the gamma isomer due to the formation of large amounts of by-products. G. H. Wagner in U.S. Pat. No. 2,637,738 discloses that considerable amounts of silicon tetrachloride and propyltrichlorosilane were formed when the catalyst was platinum deposited on charcoal. Similar results were reported by J. W. Ryan et al. in J. Am. Chem. Soc., 82, 3601 (1960) using a platinum-chloroplatinic acid catalyst. Isomerization of alkenes during hydrosilation in the presence of platinum catalysts due to migration of the double bond is reported in "Homogeneous Catalysis by Metal Complexes" by M. M. Taqui Khan et al. pages 66–68 Vol. II, Academic Press, NYC (1974).

It is therefore an object of this invention to provide a method of preparing addition products of substituted olefinically unsaturated hydrocarbons and chlorosilanes in such a manner that one structural isomer is favored over the other by enhanced reaction at the unsubstituted carbon atom of the olefinically unsaturated hydrocarbon with the chlorosilane.

Another object of this invention is to find a method for the preparation of olefinically unsaturated hydrocarbon - chlorosilane addition products in high yield without the formation of significant amounts of by-products.

SUMMARY OF THE INVENTION

The platinum catalyzed addition reaction of a chlorosilane, containing at least one hydrogen bonded to silicon, with an olefinically unsaturated hydrocarbon other than acrylonitrile has been improved by a method which comprises carrying out said reaction in the presence of a promoter selected from the group consisting of phenothiazine, diphenylamine, N,N-diphenyl-p-phenylenediamine or phenoxazine.

DESCRIPTION OF THE INVENTION

The nature of the platinum catalyst is not narrowly critical but it is preferred that it form a homogeneous solution with the other components of the reaction mixture. Exemplary platinum catalysts include chloroplatinic acid, $H_2PtCl_6$, complexes of dichloroplatinum, $PtCl_2$, with ligands, such as, mesityl oxide, and the like. If desired one can use a heterogeneous catalyst, such as, metallic platinum alone or on a support such as gamma alumina, activated carbon and the like. These and other forms of platinum catalysts have been described in the literature for the general reaction of a chlorosilane with an olefin.

The olefinically unsaturated hydrocarbons which are useful in the method of this invention include ethylene and ethylene substituted on one carbon atom with groups such as phenyl, substituted phenyl, alkyl, chloroalkyl, chlorobenzyl and like moieties. Examples of the latter group include styrene, vinyltoluene, vinylbenzyl chloride, allyl chloride, allyl cyanide, and the like.

However, acrylonitrile does not function as a satisfactory olefinically unsaturated hydrocarbon for the addition to a chlorosilane using the method of this invention. Experiments using chloroplatinic acid alone or in combination with phenothiazine failed completely to effect the condensation of trichlorosilane and acrylonitrile.

The chlorosilane reactants may be depicted in general by the following structural formula:

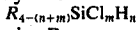

wherein $R$ represents an alkyl radical, such as methyl, ethyl, propyl, and the like, an aryl radical, such as phenyl, naphthyl, and the like, a substituted alkyl radical such as cyanoalkyl, carbethoxyalkyl, and the like, a substituted aryl radical, such as halo aryl, cyanoaryl, carbethoxy aryl, or an alkyl, aryl, aralkyl, or alkaryl ether radical; $n$ and $m$ each having a value of from one to three and the sum of $n + m$ being no more than four. This class then includes monochlorosilanes, dichlorosilanes, and trichlorosilanes containing at least one silicon-bonded hydrogen atom. Preferred chlorosilanes include trichlorosilane and methyldichlorosilane.

Temperature is not narrowly critical in these reactions since the promoter permits one to operate at temperatures lower than those conventionally used for the addition of chlorosilanes to olefins and in some instances to operate at temperature ranges where no reaction will take place with a platinum catalyst in the absence of the promoters enumerated above.

While it is preferred to use atmospheric pressure for economic reasons, subatmospheric or superatmospheric pressures can be used. Preferably the reaction is conducted under atmospheric conditions at the refluxing temperature of the particular mixture being used. Reaction may also be effected at lower than refluxing temperatures by controlled heating which has the advantage of lowering the energy requirements used in a commercial operation and also in keeping side reactions due to polymerization of the olefin to a minimum.

The amount of platinum catalyst used is not narrowly critical and can range from about 5 to about 10,000 parts per million (ppm) by weight based on the total weight of the reactants.

The amount of promoter used is also not critical and can vary from about 0.001 to about 10 weight percent of promoter based on the weight of the total reactants charged.

The invention is further described in the examples which follow. All parts and percentages are by weight unless otherwise specified. As can be seen from the experimental data, the promoter served both to lower the reaction temperature and to inhibit polymerization of the olefinically unsaturated hydrocarbon reactant. In some cases the effect of the promoter was so pronounced that reactions which would not take place in its absence occured readily in its presence. Thus, for example, no apparent reaction took place between allyl chloride and trichlorosilane in the presence of 25 ppm of platinum at a reflux temperature of 42°C. (atmospheric pressure). Reaction was initiated upon adding phenothiazine. Under forced conditions (70°C. in an autoclave) at which the reaction can proceed both with and without phenothiazine, which permits a comparison to be made of both conditions, a definite gain in the product yield was obtained with phenothiazine present.

The reaction between vinylbenzyl chloride and trichlorosilane barely took place at 80°C. in the presence of 30 ppm by weight of platinum (as chloroplatinic acid). No improvement in reactivity was observed even at 100° and 150 ppm of platinum catalyst. Addition of phenothiazine unexpectedly promoted the reaction to proceed at 60°C. and 30 ppm of platinum. Conversion of these reactants to the addition product was almost quantitative. A similar effect was observed when N,N-diphenyl-p-phenylenediamine was used as the promoter.

The reaction of styrene with trichlorosilane took place at ambient temperatures both with and without the presence of phenothiazine. However, both alpha- and beta-adducts were formed in the absence of phenothiazine as opposed to the exclusive formation of the beta-adduct in the run where phenothiazine was present. Similarly, addition of trichlorosilane to vinyltoluene gave only beta-adducts in the presence of phenothiazine. This beta-directing effect of phenothiazine was further demonstrated in the reaction of styrene and methyl dichlorosilane to give a substantially higher yield of beta-isomer over that of the alpha-isomer.

EXAMPLE 1

Reaction of Vinylbenzyl Chloride with Trichlorosilane

To a 250 ml. 3-necked flask equipped with a Friedrich condenser, thermometer, addition funnel and magnetic stirrer were charged 77.5 grams of vinylbenzyl chloride (98.5 percent purity, 0.5 mols; mixture of the para and meta isomers in a 40:60 ratio) and 0.14 grams of phenothiazine. After the flask had been heated to 60°C., 0.10 cc. of a 10 percent (wt./vol.) chloroplatinic acid solution in a mixture of dimethoxyethylene glycol and ethanol (90:10 by volume) was added, followed by gradual addition of 66.75 grams (0.493 moles) of trichlorosilane through the addition funnel. The concentration of elemental Pt was 30 ppm. A reaction temperature of 60°–70°C. was maintained by controlling the rate of addition and by the use of a cooling bath. After addition was complete, heating was continued for 15 minutes. The conversion to 2-(chloromethylphenyl)ethyl trichlorosilane was quantitative as shown by gas chromatographic analysis. The crude product was esterified directly with 136 grams (4.25 moles) of methanol without isolation under reduced pressure (100–130 mm Hg) with a water aspirator and was shown to be 93 percent pure by gas chromatographic analysis. The esterified product, 2-(chloromethylphenyl)ethyl trimethoxysilane was identical with the reaction product of trimethoxysilane and vinylbenzyl chloride catalyzed by chloroplatinic acid.

Analysis for the esterified product calculated for $C_{12}H_{19}ClO_3Si$ was: C, 52.44; H, 6.96; Cl, 12.90; Si, 10.21. Found: C, 52,45; H, 6.90; Cl, 12.96; Si, 10.26. The refractive index of the product $n_D^{20} = 1.4967$.

EXAMPLE 2

Reaction of Vinylbenzyl Chloride with Trichlorosilane

Following the procedure described in Example 1, 155.0 grams of vinylbenzyl chloride (98.5 percent pure, 1.0 moles) was reacted with 136 grams of trichlorosilane (1.0 moles) in the presence of 0.3 grams (1000 ppm) of N,N-diphenyl-p-phenylenediamine and 0.20 cc of 10 percent (wt./vol.) chloroplatinic acid (to provide 30 ppm of elemental Pt in total charge) in the solent mixture described in Example 1 at 60°–70°C., followed by methanolysis with 272 grams of methanol (8.5 moles). Vacuum distillation afforded 253 grams of 2-(chloromethylphenyl)ethyl trimethoxysilane having a purity of 98 percent (93 percent yield, $n_D^{20} = 1.4970$).

Control A. Reaction of Vinylbenzyl Chloride with Trichlorosilane

When Example 1 was repeated with the exception that no phenothiazine promoter was present, the reaction expired after a brief exotherm. Increase of chloroplatinic acid loading to 150 ppm of Pt did not revive the reaction.

EXAMPLE 3

Reaction of Allyl Chloride with Trichlorosilane

To a 250 ml, 3-neck flask equipped with condenser (ice cooling), thermometer and stirrer was charged 33.2 grams (0.435 moles) of allyl chloride.

TABLE 1

REACTION OF ALLYL CHLORIDE AND TRICHLOROSILANE

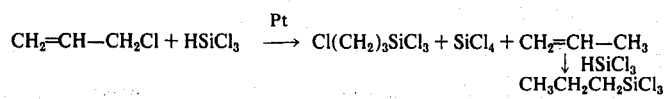

$$CH_2=CH-CH_2Cl + HSiCl_3 \xrightarrow{Pt} Cl(CH_2)_3SiCl_3 + SiCl_4 + CH_2=CH-CH_3$$
$$\downarrow HSiCl_3$$
$$CH_3CH_2CH_2SiCl_3$$

| EXAMPLE | REACTION TEMP. °C | PHENOTHIAZINE PRESENT | % BREAKDOWN OF COMPONENTS IN PRODUCT ||||||
|---|---|---|---|---|---|---|---|---|
| | | | $C_3H_6$ | $HSiCl_3$ | $SiCl_4$ | $C_3H_5Cl$ | $PrSiCl_3$[a] | $ClPrSiCl_3$[b] |
| 3 | 40-45 | Yes | 0.4 | 0.8 | 17.3 | 6.5 | 5.5 | 68.5 |
| CONTROL B | 70 | No | 1.8 | 0.3 | 16.5 | 11.0 | 13.0 | 53.5 |
| 4 | 70 | Yes | 1.5 | 0.9 | 15.9 | 9.6 | 12.3 | 58.1 |

[a] $CH_3CH_2CH_2SiCl_3$
[b] $Cl(CH_2)_3SiCl_3$

The contents of the flask were heated to 42°C. and then 54.3 grams (0.40 mols) of trichlorosilane was added dropwise. The boiling point dropped to 40°C. and 0.05 grams of 10 percent (wt./vol.) chloroplatinic acid (to provide 25 ppm of elemental Pt in total charge) in the solvent mixture described in Example 1 was added. No reaction took place for 10 minutes. When 10 mg. of phenothiazine was added, reaction was initiated in 2 minutes as evidenced by an exotherm. Cooling was provided while adding trichlorosilane slowly to maintain a reaction temperature of 40°-45°C. After addition was complete (30 minutes) heating was continued for 15 minutes at 60°C. A product of 79.4 grams (theoretical, 86.6 grams) was obtained with the anaylsis shown in Table I.

Control B. Reaction of Allyl Chloride with Trichlorosilane

To a semi-batch recirculating reactor (50 gallons) equipped with an external heat exchanger was charged a mixture of 170 pounds of allyl chloride and 316 cc. of 10 percent (wt./vol.) chloroplatinic acid (to provide 60 ppm of elemental Pt in total charge) in the solvent mixture described in Example 1. Trichlorosilane (263 pounds) was weighed into the system feed tank. The reactor recycle pump was started and the allyl chloride catalyst mixture was heated to 70°C. The trichlorosilane feed was started and the reaction exotherm was noted in 5 minutes or less. After the reaction initiated, the heat exchanger temperature was reduced to maintain a constant water temperature of 60°C. A trichlorosilane feed was automatically controlled to maintain a bulk liquid temperature of 70°C. (pressure, 50 psig). At the end of the reaction the reactor was held for 1 hour at 70°C., then cooled and discharged into drums. 425 Pounds of product was recovered with the anaylsis shown in Table I.

EXAMPLE 4

Reaction of Allyl Chloride with Trichlorosilane

Following the procedure described in Control B, 263 pounds of trichlorosilane was reacted with 170 pounds of allyl chloride at 70°C. in the presence of 316 cc. of 10 percent (wt./vol.) chloroplatinic acid in the solvent mixture described in Example 1 and 12 grams of phenothiazine which yielded 415 pounds of product. A higher yield of the desired product $Cl(CH_2)_3SiCl_3$ was obtained than in Control B as shown in Table I.

Control C. Reaction of Styrene and Trichlorosilane

To a 35 ml. serum vial was charged 1.0 grams (9.6 millimoles) of styrene and 1.35 grams (10.0 millimoles) of trichlorosilane and the vial sealed. Chloroplatinic acid (2 micro liters of a 10 percent wt./vol. solution in the solvent mixture described in Example 1.) was then added through the septum. The reaction initiated immediately as evidenced by an exotherm. Analysis by gas chromatography showed the formation of alpha and beta adducts in a 5:95 ratio, the alpha adduct having the structure

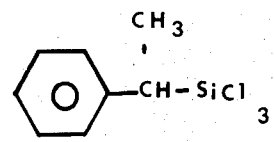

and the beta adduct being phenylethyl having the structure

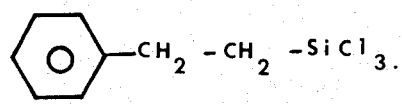

EXAMPLE 5

Reaction of Styrene and Trichlorosilane

When the above reaction of Control B was carried out in the presence of 1 milligram of phenothiazine, only beta adduct (phenylethyltrichlorosilane) was formed.

Control D. Reaction of Vinyltoluene and $HSiCl_3$

The procedure described for Control C was followed using 1.18 g. (10.0 mols) of vinyltoluene (mixture of isomers as in Example 1) in place of styrene, under ambient conditions over night. Analysis by gas chromatography showed the formation of four products, viz., two α-adducts having the formulas:

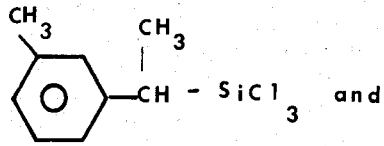 and 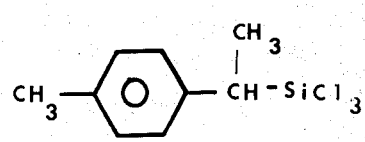

and two β-adducts having the formulae:

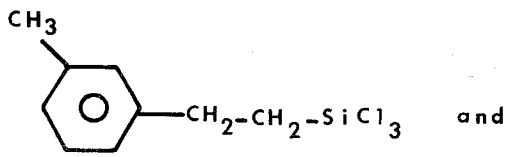 and 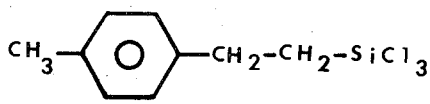

in a ratio of 35 α-adducts: 65 β-adducts.

EXAMPLE 6

Reaction of Vinyltoluene and HSiCl₃

Control D was repeated with the exception that 1 mg. of phenothiazine was added to the charge. The reaction was initiated in 30 seconds and was complete in 15 minutes. Analysis showed that the product consisted solely of the β-adducts.

Control E. Reaction of Styrene and HSiCl₂CH₃

A stock solution was formulated with 10.5 g. (91.3 millimoles) of methyldichlorosilane and 9.8 g. (94.2 millimoles) of styrene. To a 3 g. aliquot of the stock solution in a 35 ml. serum vial was injected 6 microliters of 3.3 percent (wt./vol.) chloroplatinic acid in the solvent mixture described in Example 1. The concentration of elemental Pt based on the total reactant charge was 25 ppm. Reaction set in at room temperature in 4 minutes. Analysis by gas chromatography showed that the product was composed of 75 parts of the β-adduct:

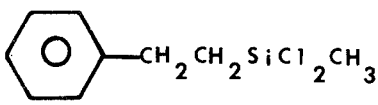

and 25 parts of the α-adduct:

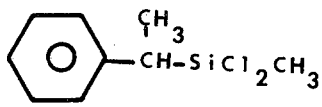

When the reaction was repeated at 70°C. the product ratio was 65 β-adduct: 35 α-adduct:

EXAMPLE 7

Reaction of Styrene and HSiCl₂CH₃

Control E was repeated with the exception that 1 mg. of phenothiazine was added to the stock solution. An exotherm developed in 5 minutes at room temperature. The product consisted of 94 parts of β-adduct and 6 parts of α-adduct.

EXAMPLES 8–9

Reaction of Styrene and HSiCl₂CH₃

In order to demonstrate the enhanced catalytic effect of the promoters of this invention and to distinguish this effect from that due to differences in temperature, several runs were made at low temperatures, viz., 20°C. over a period of 2 days. This technique also served to provide slower reaction rates free from sudden surges in temperature.

TABLE II

| EXAMPLE | PROMOTER | % CONVERSION TO STYRENE ADDUCT | | PRODUCT SELECTIVITY | |
|---|---|---|---|---|---|
| | | 1 Day | 2 Days | 1 Day | 2 Days |
| 8 | Phenothiazine | 5 | 65 | 100% β - adduct | 100% β - adduct |
| 9 | N,N-diphenyl-p-phenylenediamine | 15 | 86 | 100% β - adduct | 100% β - adduct |
| CONTROL F | NONE | NONE | 20 | NONE | 17% α - adduct 83% β - adduct |

It was thus easier to observe and compare runs using the promoted catalysts with Controls using no promoters.

Three samples each containing 1.0 grams (9.6 millimoles) of styrene and 1.1 grams (9.5 millimoles of methyldichlorosilane were prepared in a 35 ml. serum vial. To the first sample was added 1 mg. of phenothiazine and to the second 1 mg. of N,N-diphenyl-p-phenylenediamine. The third sample was used as Control F and had no promoter added to it. The vials were maintained at 20°C. and 1 microliter of 10 percent (wt./vol.) chloroplatinic acid in the solvent mixture described in Example 1 added to all three samples. The concentration of elemental Pt was 18 ppm based on the total charge. It can be seen from Table II that not only is the percent conversion significantly greater in Examples 8 and 9 over that of Control F but that the product selectivity is also superior for Examples 8 and 9, where only the β-adduct of styrene was produced.

EXAMPLES 10–11

Reaction of Styrene with CH₃SiCl₂H

Two samples containing 1.0 g. of styrene (9.6 millimoles), 1.1 g. of methyldichlorosilane (9.5 millimoles) and 1.0 mg. of diphenylamine were prepared in 35 ml. serum vials. To the first sample was added 1.5 microliters of 10 percent (wt./vol.) of chloroplatinic acid in the solvent mixture described in Example 1 (27 ppm of elemental Pt in total charge). To the second sample was added 2.0 microliters of 10 percent chloroplatinic acid (36 ppm of elemental Pt) in the same solvent mixture. In the first sample, Example 10, the temperature of the reactants rose to about 45°C., the conversion to styrene adduct was >99 percent all of which was the β-adduct. In the second sample, Example 11, the temperature of the reactants rose to about 60°C., the conversion to styrene adduct was >99 percent but 4.1 percent of the product was the α-adduct and 95.8 percent was the β-adduct. In both Examples the reaction took 1 to 2 hours. These experiments demonstrate that the reaction temperature should be kept to a minimum for maximum selectivity of isomers obtained in the addition reaction of chlorosilane to a substituted olefin.

Control G. Reaction of Ethylene With Trichlorosilane without a Promoter

Trichlorosilane (300 lbs.) was charged to a semi-batch recirculating reactor (50 gallons) and heated to 70°C. in the presence of 36 ml. of 10 percent (wt./vol.) chloroplatinic acid (10 ppm of elemental Pt in total charge) in the solvent mixture described in Example 1. The reactor pressure was 39 psig. Ethylene was then charged to the reactor in an amount sufficient to maintain a reactor pressure of 60 psig and a temperature of 70°C. The progress of the reaction was monitored

TABLE III

| REACTION TIME, HOURS | CONTROL G PRODUCT ANALYSIS, WT. % | | |
|---|---|---|---|
| | $CH_3CH_2SiCl_3$ | $HSiCl_3$ | $SiCl_4$ |
| 2 | 1.8 | 97.8 | 0.1 |
| 4 | 2.6 | 97.0 | 0.1 |
| 6 | 3.3 | 96.2 | 0.1 |
| 9 | 5.6 | 93.9 | 0.1 |
| 11 | 7.2 | 92.4 | 0.1 |
| 13 | 8.6 | 91.0 | 0.1 |
| 15 | 9.8 | 89.9 | 0.1 |
| 19 | 12.3 | 87.4 | 0.1 | by gas chromatographic analysis of the products. The results are delineated in Table III.

EXAMPLE 12

Reaction of Ethylene With Trichlorosilane Promoted with Phenothiazine

Control G was repeated with the exception that the charge also contained 30 g. of phenothiazine. The results of the gas chromatographic analysis of the products thus obtained are presented in Table IV. From the comparative data of Control G and Example 12 it can be seen that the reaction in the presence of phenothiazine as a promoter was much faster than of the unpromoted Control G.

TABLE IV

| REACTION TIME, HOURS | EXAMPLE 12 PRODUCT ANALYSIS, WT. % | | |
|---|---|---|---|
| | $CH_3CH_2SiCl_3$ | $HSiCl_3$ | $SiCl_4$ |
| 2 | 5.1 | 92.6 | 0.1 |
| 4 | 9.0 | 90.3 | 0.1 |
| 6 | 14.2 | 84.4 | 0.1 |

Control H

Example 10 was repeated with the exception that morpholine was substituted for diphenylamine. Morpholine was found to retard rather than promote the addition of methyldichlorosilane to styrene.

Control I

A mixture of 13.5 grams (0.1 moles) of trichlorosilane and 5.8 grams (0.11 moles) of acrylonitrile was prepared. To a 3 gram aliquot sample of this mixture was added 2 microliters of 10 percent (wt./vol.) of chloroplatinic acid in the solvent mixture described in Example 1 (27 ppm of elemental Pt based on total charge). This treated aliquot was sealed in a vial and heated at 75°C. for 1 hour. Analysis of the vial contents by vapor phase chromatography revealed no addition product of trichlorosilane and acrylonitrile.

Control J

Control G was repeated with the exception that 1 mg. of phenothiazine was added to the 3 gram aliquot sample. No addition product of trichlorosilane and acrylonitrile could be detected by vapor phase chromatography.

EXAMPLE 13

Reaction of Allyl Cyanide with $CH_3SiCl_2H$

The reaction mixture of 0.67 grams of allyl cyanide (10 millimoles), 1 mg. of diphenylamine and 1.15 grams of methyldichlorosilane (10 millimole) is catalyzed with 1 microliter of 10 percent chloroplatinic acid solution in the same solvent described in Example 1 (25 ppm of Pt) was subjected to a temperature of 70°C. Reaction was complete in 15 minutes as monitored by gas chromatographic analysis, to afford γ-cyanopropylmethyldichlorosilane in better than 95 percent yield.

Control K

Example 13 was repeated with the exception the diphenylamine promoter was omitted. Only 11 percent product was obtained, viz., γ-cyanopropylmethyldichlorosilane.

Although the invention has been described in its preferred forms with a certain degree of particularity, it is understood that the present disclosure of the preferred forms has been made only by way of example and that numerous changes may be resorted to without departing from the spirit and scope of the invention.

What is claimed is:

1. In the platinum catalyzed addition reaction of a chlorosilane, containing at least one hydrogen bonded to silicon, with an olefinically unsaturated hydrocarbon other than acrylonitrile, an improved method which comprises carrying out said addition reaction in the presence of about 0.001 to about 10 percent, by weight based on the total weight of reactants of a promoter selected from the group consisting of phenothiazine, diphenylamine, N,N-diphenyl-p-phenylenediamine or phenoxazine.

2. Method claimed in claim 1 wherein the promoter is phenothiazine.

3. Method claimed in claim 1 wherein the promoter is diphenylamine.

4. Method claimed in claim 1 wherein the promoter is N,N-diphenyl-p-phenylenediamine.

5. Method claimed in claim 1 wherein the promoter is phenoxazine.

6. Method claimed in claim 1 wherein the olefinically unsaturated hydrocarbon is vinylbenzyl chloride.

7. Method claimed in claim 1 wherein the olefinically unsaturated hydrocarbon is allyl chloride.

8. Method claimed in claim 1 wherein the olefinically unsaturated hydrocarbon is styrene.

9. Method claimed in claim 1 wherein the olefinically unsaturated hydrocarbon is vinyltoluene.

10. Method claimed in claim 1 wherein the olefinically unsaturated hydrocarbon is ethylene.

11. Method claimed in claim 1 wherein the olefinically unsaturated hydrocarbon is allyl cyanide.

12. Method claimed in claim 1 wherein the chlorosilane is trichlorosilane.

13. Method claimed in claim 1 wherein the chlorosilane is methyldichlorosilane.

* * * * *